(12) United States Patent
Kara

(10) Patent No.: US 11,186,015 B2
(45) Date of Patent: Nov. 30, 2021

(54) POD PROCESSING DEVICE

(71) Applicant: James Kara, Avon Lake, OH (US)

(72) Inventor: James Kara, Avon Lake, OH (US)

(73) Assignee: Creative Green Designs LLC, Avon Lake, OH (US)

( * ) Notice: Subject to any disclaimer, the term of this patent is extended or adjusted under 35 U.S.C. 154(b) by 231 days.

(21) Appl. No.: 16/398,971

(22) Filed: Apr. 30, 2019

(65) Prior Publication Data

US 2020/0346370 A1   Nov. 5, 2020

(51) Int. Cl.
*B29B 17/02* (2006.01)
*B67B 7/46* (2006.01)
*A47J 31/44* (2006.01)
*B29L 31/00* (2006.01)

(52) U.S. Cl.
CPC ............... *B29B 17/02* (2013.01); *A47J 31/44* (2013.01); *B67B 7/30* (2013.01); *B29L 2031/712* (2013.01)

(58) Field of Classification Search
CPC .. B67B 7/30; B67B 7/24; B29B 17/02; B29B 2017/0203; B29B 2017/22; A47J 31/44; A47J 31/4403; A47J 31/3628
USPC ......... 30/1.5, 2, 400–462, 92–113, 280, 294, 30/314–317
See application file for complete search history.

(56) References Cited

U.S. PATENT DOCUMENTS

| 1,891,090 | A | * | 12/1932 | Hall | 30/2 |
| 3,094,776 | A | * | 6/1963 | Smith | B67B 7/34 30/422 |
| 3,765,282 | A | * | 10/1973 | Crain, Jr. | B26F 1/28 83/13 |
| 4,391,042 | A | * | 7/1983 | Sunderland | B26B 27/00 30/123 |
| 6,971,180 | B2 | * | 12/2005 | Yocum | B65B 69/0033 30/366 |
| 7,171,753 | B2 | * | 2/2007 | Korczak | H02G 1/1224 30/90.1 |
| 2004/0056033 | A1 | * | 3/2004 | Bohlman | B67B 7/24 220/278 |
| 2011/0232111 | A1 | * | 9/2011 | Duval | B67B 7/38 30/411 |
| 2014/0123505 | A1 | * | 5/2014 | Raghuprasad | B67B 7/30 30/445 |
| 2017/0057122 | A1 | | 3/2017 | Grantham | |
| 2017/0217651 | A2 | * | 8/2017 | Stirn | B67D 3/0061 |

FOREIGN PATENT DOCUMENTS

FR    3069231 A1 *  1/2019  ......... B65B 69/0041
WO    WO-9324405 A1 * 12/1993  ............... B67B 7/44

OTHER PUBLICATIONS

Recycle A Cup; https://www.recycleacup.com/how-it-works/, Apr. 29, 2019, 1 page.

* cited by examiner

*Primary Examiner* — Evan H Macfarlane
(74) *Attorney, Agent, or Firm* — Tucker Ellis LLP

(57) ABSTRACT

A pod processing device includes a top plate having a first aperture, and a cutting plate having a top surface and a bottom surface. The cutting plate can be attached to the top plate such that the cutting plate is spaced a distance from the top plate. The cutting plate can include at least one cutting blade extending at an angle from the top surface of the cutting plate along a portion of the distance towards the top plate. The pod processing device can be used to remove the lid from a pod to facilitate composting of the contents of the pod.

12 Claims, 10 Drawing Sheets

POD PROCESSING DEVICE

TECHNICAL FIELD

In general, the present innovation relates to a pod processing device, and more particularly to a tool for cutting a top lid from a pod to facilitate recycling.

BACKGROUND

Pod is a term used to describe a disposable container that contains a contents such as pre-packaged coffee or other material. Pods can be used with a machine to add liquid to produce a drink or mixture. For example, pods provide a convenient way of storing and brewing coffee. A user can insert the pod into a compatible machine for brewing. Once the drink or mixture is produced (e.g. coffee is brewed), the pod, and any of its remaining contents such as coffee grinds, tea leaves, or drink mix, are typically thrown into the trash.

SUMMARY

In accordance with an embodiment of the present innovation, disclosed is a pod processing device for cutting a top lid of a pod to facilitate composting of the pod contents and/or recycling or re-usability of the pod. The pod processing device includes a top plate having a first aperture and a cutting plate with a top surface and a bottom surface. The cutting plate is attached to the top plate such that the cutting plate is spaced a distance from the top plate. The cutting plate includes one or more cutting blades that extend at an angle from the top surface of the cutting plate along a portion of the distance towards the top plate.

The pod processing device is configured to receive a pod within a first aperture of the top plate. The one or more cutting blades that extend from the cutting plate can pierce a lid on the top of the pod. In particular, a pod can be inserted into the first aperture, which enables the one or more cutting blades to cut the lid on the pod. The one or more blades cut through the lid with rotation, wherein the rotation can be the pod cutting tool rotating around the pod or the pod rotating within the aperture of the pod cutting tool. After the one or more blades cut through the lid of the pod with the rotation, the contents of the pod can be removed. The contents of the pod can then be composted and/or the pod material can be recycled when the pod material is recyclable.

These and other objects of this innovation will be evident when viewed in light of the drawings, detailed description and appended claims.

BRIEF DESCRIPTION OF THE DRAWINGS

The innovation may take physical form in certain parts and arrangements of parts, a preferred embodiment of which will be described in detail in the specification and illustrated in the accompanying drawings which form a part hereof, and wherein.

DETAILED DESCRIPTION

Figure 1:
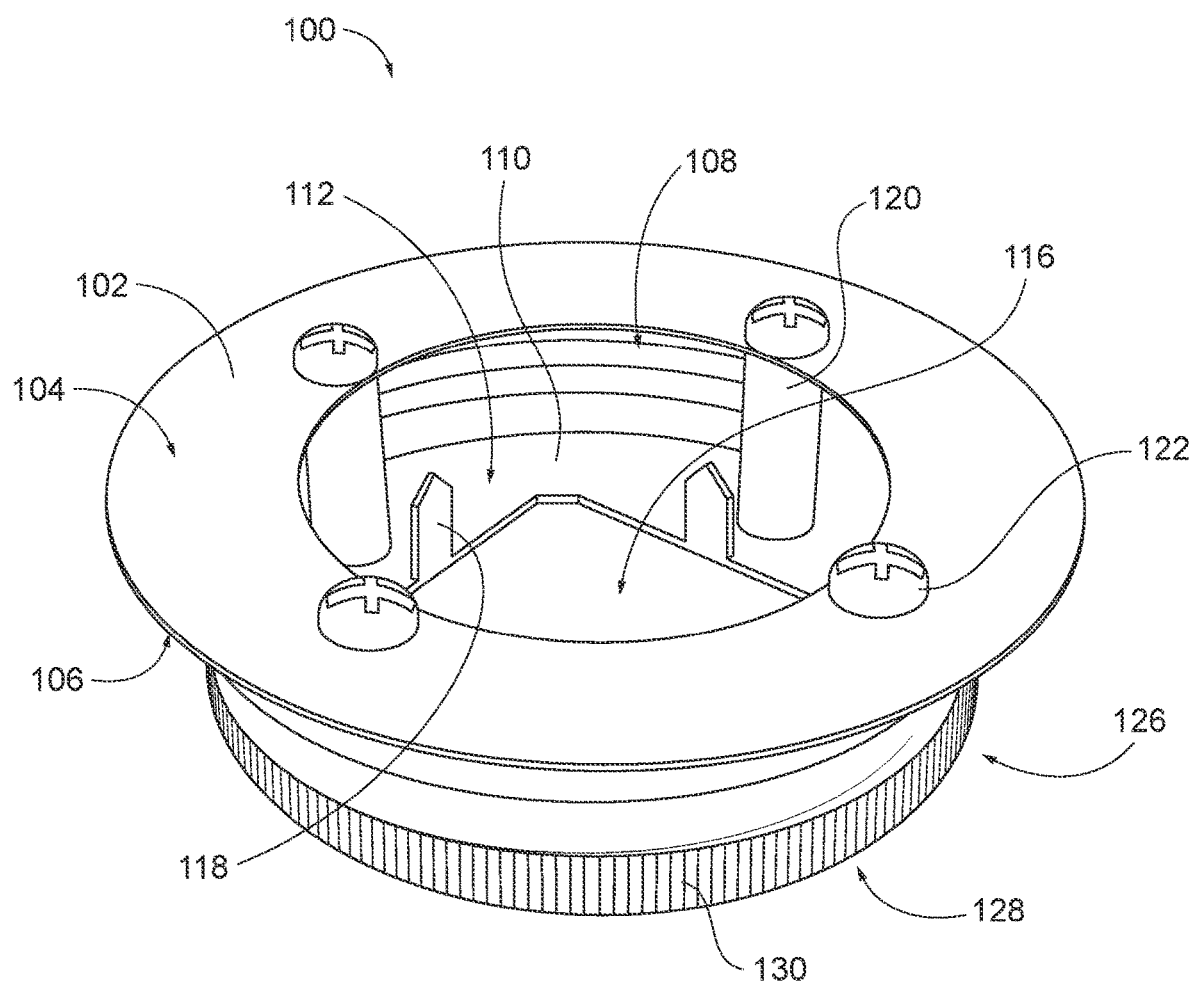
FIG. 1 is a top perspective view of an exemplary pod processing device.

Embodiments of the innovation relate to methods and systems that relate to a pod processing device. The pod processing device can be a standalone device or it can be secured to the opening of a container. The pod processing device is configured to cut the lid from the top of a pod to allow the removal of the contents of the pod.

"Pod" as used herein including any other formatives of this word will refer to any single-serve beverage container. An example of a pod is the K-Cup® used with single-serve coffee brewing systems. It should be appreciated that the term pod can refer to any similar single-serve beverage container used for brewing beverages such as coffee, tea, espresso, hot chocolate, flavored water, soda, soft drinks, among others.

With reference to the drawings, like reference numerals designate identical or corresponding parts throughout the several views. However, the inclusion of like elements in different views does not mean a given embodiment necessarily includes such elements or that all embodiments of the innovation include such elements. The examples and figures are illustrative only and not meant to limit the innovation, which is measured by the scope and spirit of the claims.

A pod can store a material in a disposable manner that is utilized by a machine or device to craft a drink, liquid or mixture by combining a liquid with the material. By way of example and not limitation, the material can be coffee grinds, powder, flavored powder, condensed flavorings, concentrated liquid, among others. The material contents of the pod can be selected with sound engineering judgment without departing from the scope of the subject innovation. The pod can be any particular shape or size and is configured to store a volume of material, sometimes in an air-tight manner. In a particular embodiment, the pod can be cylindrical in shape having a top end and a bottom end, where the diameter of the top end is equal to or greater than the diameter of the bottom end. The top end and the bottom end can be connected thereto by a cylindrical sidewall. The top end includes a lid that can act as a seal for the pod. The size and shape of the pod can be selected with sound engineering judgment without departing from the scope of the subject innovation. The pod can further be fabricated by any suitable materials such as, but not limited to, plastic, paper, foil, etc. In one embodiment, the sidewall of the pod is made of plastic and the lid at the top of the pod is made of foil. It should be appreciated that the material of the pod can be selected with sound engineering judgment without departing from the scope of the subject innovation.

FIG. 1 illustrates an embodiment of a pod processing device 100. The pod processing device 100 can include a top plate 102 having a top surface 104, a bottom surface 106, a thickness between the top surface 104 and the bottom surface 106, and a first aperture 108. The first aperture 108 can be any suitable shape as long as it is sized to accommodate the shape and size of a pod. In one embodiment, the first aperture 108 is circular to coincide with a shape of the top side of a pod.

Figure 2:
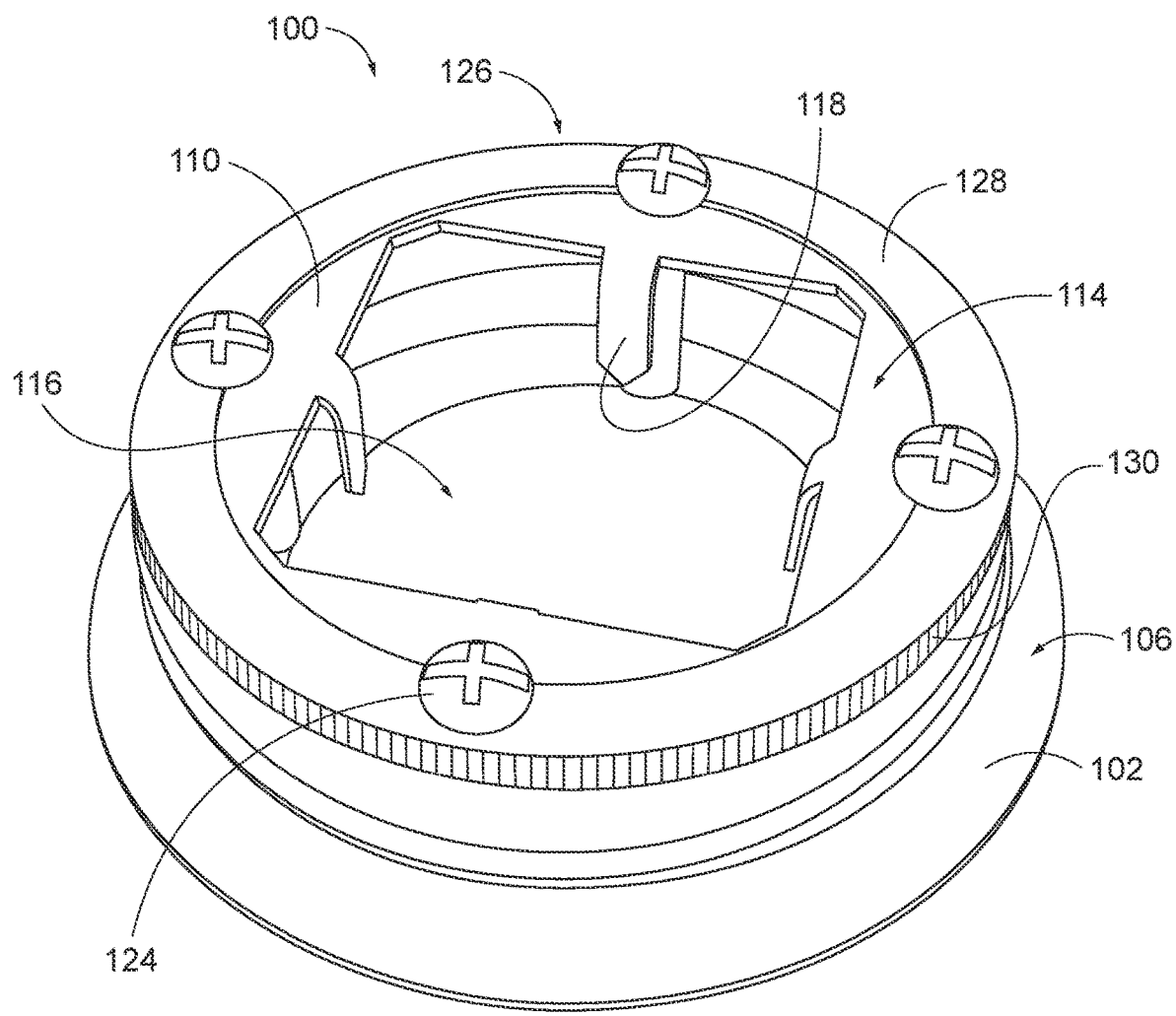
FIG. 2 is a bottom perspective view of an exemplary pod processing device.

The top plate 102 can be removeably coupled to a cutting plate 110, although it will be appreciated that in another embodiment, the top plate 102 can be coupled to the cutting plate 110 and not be removable. The cutting plate 110 can include a top surface 112, a bottom surface 114 (as shown in FIG. 2), a thickness between the top surface 112 and the bottom surface 114, a second aperture, and a plurality of cutting blades 118. The cutting plate 110 can be coupled to the top plate 102 such that the cutting plate 110 is spaced a distance from the top plate 102, wherein that distance can, in an embodiment, correspond to a height of a pod. In certain embodiments, the distance can correspond to a height that is less than or equal to the height of a pod. The cutting plate 110 can include the second aperture 116 that can be configured to be aligned with the first aperture 108. The second aperture 116 can be any suitable shape, such as square shaped, rectangular, circular, etc. In one example, the second aperture 116 can be square shaped with rounded or angled corners. The second aperture 116 can be sized such that a top of a pod can contact the top surface 112 of the cutting plate 110 when a pod is inserted into the pod processing device 100 through the first aperture 108, but also allows material to pass through. The cutting plate 110 can also include the plurality of cutting blades 118 arranged on a perimeter of the second aperture 116 that are configured to pierce and cut through a lid (e.g. a foil lid) on the pod. Additionally, the plurality of cutting blades 118 extend at an angle from the top surface 112 of the cutting plate 110 towards the top plate 102. In one example, the plurality of cutting blades 118 extend at an angle of ninety degrees or approximately ninety degrees from the top surface 112 of the cutting plate 110. The cutting blades 118 can be formed from the same material as the cutting plate 110 and bent towards the top plate 102 at an angle, or the cutting blades 118 can be removeably attached to the cutting plate 110 so that the cutting blades 118 can be removed and replaced.

In an embodiment, the top plate 102 can be distanced from the cutting plate 110 using a plurality of spacers 120 to couple the top plate 102 to the cutting plate 110 and provide the distance therebetween as discussed above. In an example, the top plate 102 can be fastened to a first end of the spacers 120, and the cutting plate 110 can be fastened to a second end of the spacers 120. Further, the top plate 102 can be releasably secured or secured to the cutting plate 110. By way of example, the top plate 102 can be coupled to the cutting plate 110 directly or indirectly with one or more set of spacers 120 in between. A first set of screws 122 can fasten the top plate 102 to the first end of the spacers 120 and a second set of screws 124 can fasten the cutting plate 110 to the second end of the spacers 120 as shown in FIG. 2. In another example, the top plate 102 can be secured directly to the cutting plate 110. In yet another example, the top plate can be secured to a set of spacers 120, and the set of spacers 120 can be coupled to the cutting plate 110. In yet another example, the top plate 102 can be secured to a first set of spacers, the cutting plate 110 can be secured to a second set of spacers, and the first set of spacers can be coupled to the second set of spacers. In an example when spacers are employed, a length of the spacers can define the distance between the top plate 102 and the cutting plate 110. It should be appreciated that the top plate 102 and the cutting plate 110 can be fastened to the spacers 120 using any appropriate means such as screws, nuts/bolts, male/female fittings, welds, brackets, adhesive, a combination thereof, among others.

In certain embodiments, the top plate 102, the cutting plate 110, and the spacers 120 can be formed from one continuous piece of material, separate components (as described and shown), or a combination thereof. It should be appreciated that any of the components of the pod processing device 100 can be made of any suitable material including metal (e.g. steel or aluminum), plastic, rubber, wood, 3D printed material, or a combination of material types.

The pod processing device 100 can also include a ring 126 to facilitate gripping, holding, stabilizing or turning the pod cutting tool 100. The ring 126 can be a shape that corresponds to the shape of the cutting plate 110, for example, a circular shape having a rim portion 128 and a grip portion 130. The ring 126 can be fabricated as one piece, multiple pieces, or a combination thereof. The ring 126 can be fabricated from the same material or different materials including rubber, plastic, or metal. The cutting plate 110 can be disposed or nested within the ring 126 such that the bottom surface 114 of the cutting plate 110 is at least partially supported by the rim portion 128. The ring 126 can be coupled to the cutting plate 110 and the second end of the spacers 120 with the second set of screws 124 as shown in FIG. 2. In another embodiment, the ring 126 is integrated as part of the cutting plate 110. The grip portion 130 facilitates handling of the pod processing device 100 such as gripping or rotating the pod processing device 100. In one embodiment, the grip portion 130 can include a rubber surface and/or a ribbed surface to enhance grip.

Figure 3:
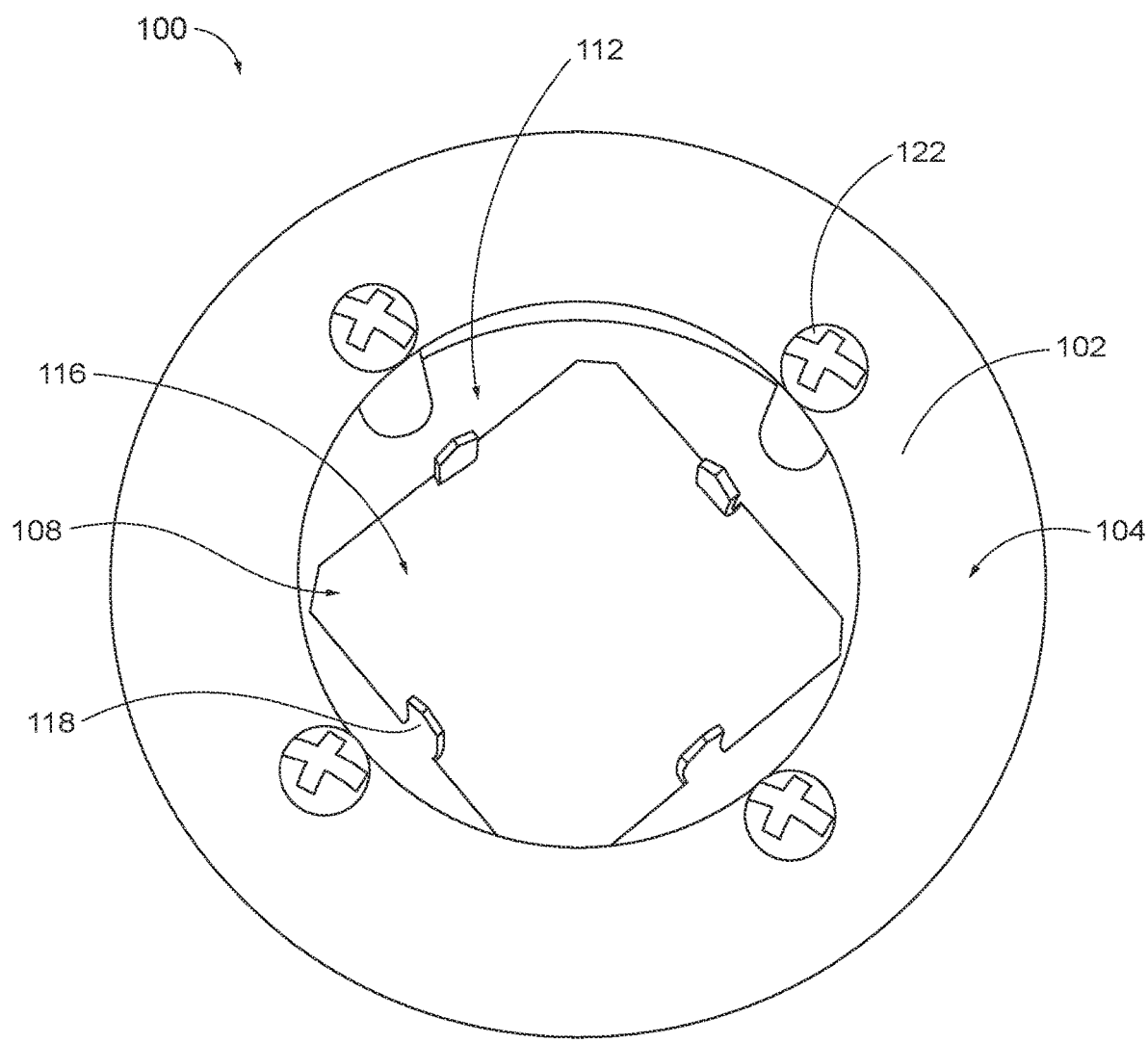
FIG. 3 is a top view of an exemplary pod processing device.

Turning now to FIG. 3, the pod processing device 100 is shown from a top view. As shown, the top plate 102 is fastened to the first end of the spacers 120 with the first set of screws 122, which are located around the perimeter of the first aperture 108. The second aperture 116 on the cutting plate 110 is arranged directly beneath, and axially aligned with the first aperture 108 of the top plate 102. The cutting blades 118 are arranged on the cutting plate 110 on the perimeter of the second aperture 116. For example, the second aperture 116 can be square-shaped, and the cutting blades 118 can include one cutting blade 118 on each side of the square. In other embodiments, the second aperture 116 can be circular and can include one or more cutting blades 118 along the perimeter of the circular aperture. Each of the cutting blades 118 extend from the top surface 112 of the cutting plate 110 towards a point within the perimeter of the first aperture 108. This arrangement ensures that the cutting blades can pierce into the lid of the pod when it is inserted through the first aperture 108. In one embodiment, the cutting blades 118 are bent at a ninety-degree angle or approximately a ninety-degree angle from the top surface 112 of the cutting plate 110. The cutting blades 118 can be shaped so that each blade has a pointed tip for piercing the lid of a pod. The cutting blades 118 can also have sharp vertical blades as sides leading up to the pointed tip.

In certain embodiments, the first aperture 108 can be adjustable in size. For example, the top plate 102 can be made of separate pieces that can slide inwards and outwards and can lock in place to secure a size of the first aperture 108. Such an adjustable aperture can allow for the insertion of differently sized and shaped pods. In further embodiments, the cutting plate 110 can be adjusted to vary the size of the second aperture 116. In still further embodiments, the cutting blades 118 can slide inwards and outwards from the perimeter of the second aperture 116 to vary the size of the cut made into the lid of a pod.

Figure 4:
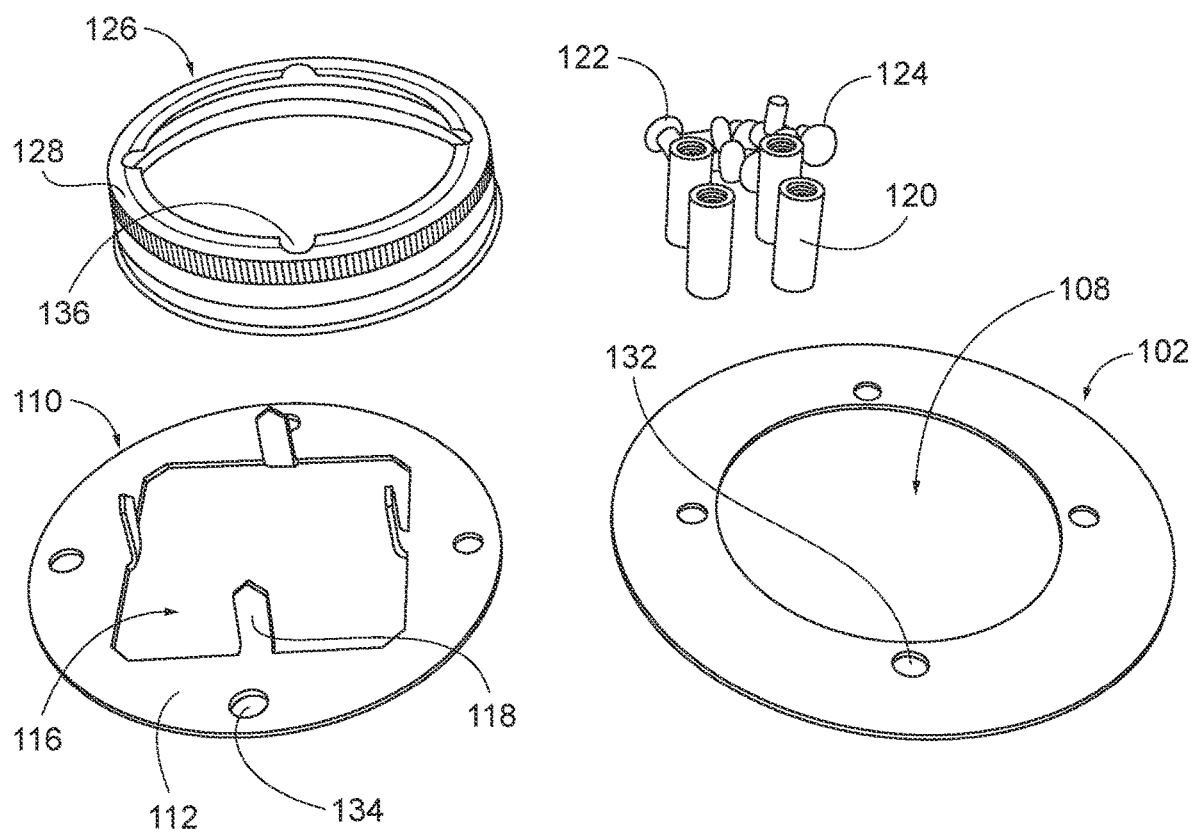
FIG. 4 is an exploded view of an exemplary pod processing device.

Turning now to FIG. 4, an exploded view of the pod processing device 100 is shown. The top plate 102 can include a first set of screw holes 132 arranged around the perimeter of the first aperture 108. In one embodiment, the first set of screw holes 132 includes four screw holes. It should be appreciated that any number of screw holes can be used and arranged in the top plate 102 around the first aperture 108. The spacers 120 can be positioned and aligned against the bottom surface 106 of the top plate 102 so that each spacer 120 corresponds with a screw hole from the first set of screw holes 132. Each spacer 120 can have a threaded interior at its first end and second end. Each screw of the first set of screws 122 can be inserted into a corresponding screw hole of the first set of screw holes 132 on the top plate 102, and screwed into the first end of the corresponding spacer 120 to fasten the spacers 120 to the top plate 102.

The cutting plate 110 can include a second set of screw holes 134 arranged around the perimeter of the second aperture 116. In one embodiment, the second set of screw holes 134 includes four screw holes. It should be appreciated that any number of screw holes can be used and arranged in the cutting plate 110 around the second aperture 116. The spacers 120 can be further positioned and aligned against the top surface 112 of the cutting plate 110 so that each spacer 120 corresponds with a screw hole from the second set of screw holes 134. Each screw of the second set of screws 124 can be inserted into a corresponding screw hole of the second set of screw holes 134 on the cutting plate 110, and screwed into the second end of the corresponding spacer 120 to fasten the spacers 120 to the cutting plate 110, which also couples the cutting plate to the top plate 102. In embodiments that include a ring 126, the ring 126 can include a third set of screw holes 136. In certain embodiments, the screw holes of the third set of screw holes 136 are only partial screw holes as they are on the edge of the rim portion 128 of the ring 126. Each screw of the second set of screws 124 can be inserted into a corresponding screw hole of the third set of screw holes 136 on the ring 126, a corresponding screw hole of the second set of screw holes 134 on the cutting plate 110, and screwed into the second end of the corresponding spacer 120 to secure the spacers 120 to both the cutting plate 110 and the ring 126, which also couples the cutting plate 110 and the rim to the top plate 102.

Figure 5:
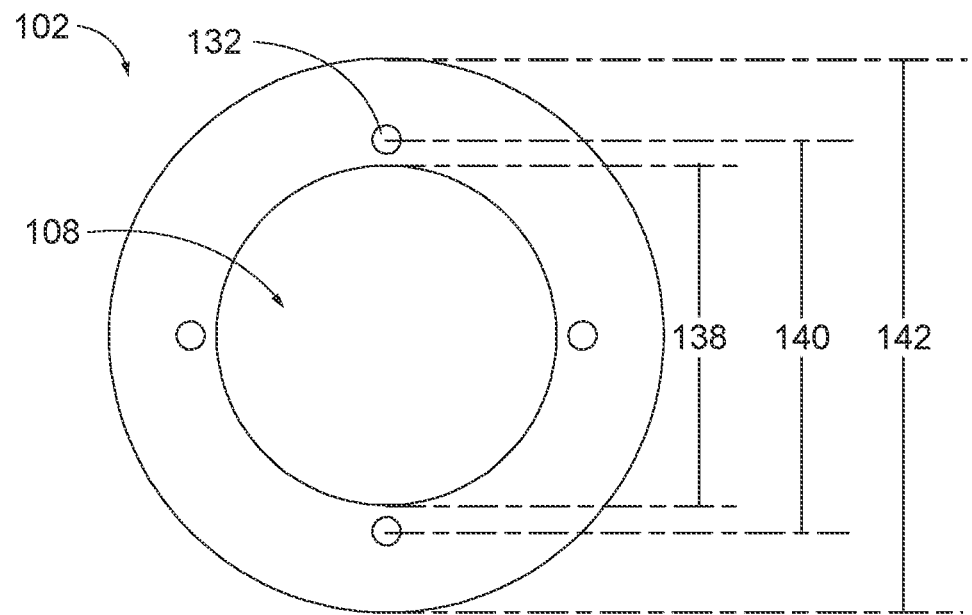
FIG. 5 is a top plan view of an exemplary top plate of a pod processing device.

Turning now to FIG. 5, an exemplary embodiment of a top plate 102 is shown. In this particular embodiment, the first aperture 108 has a first aperture diameter 138. In an embodiment, the first aperture diameter 138 can be around one and a half to two and a half inches, and in an embodiment approximately two inches. The first set of screw holes 132 can be arranged around the first aperture 108 such that opposing screw holes are at a distance 140. In an embodiment, the distance 140 can be around two to two and a half inches, and in an embodiment approximately two and a third inches. Further, the top plate 102 can have an outer diameter 142. In an embodiment, the top plate 102 outer diameter 142 can be around three to three and a half inches, and in an embodiment approximately three and a third inches.

Figure 6:
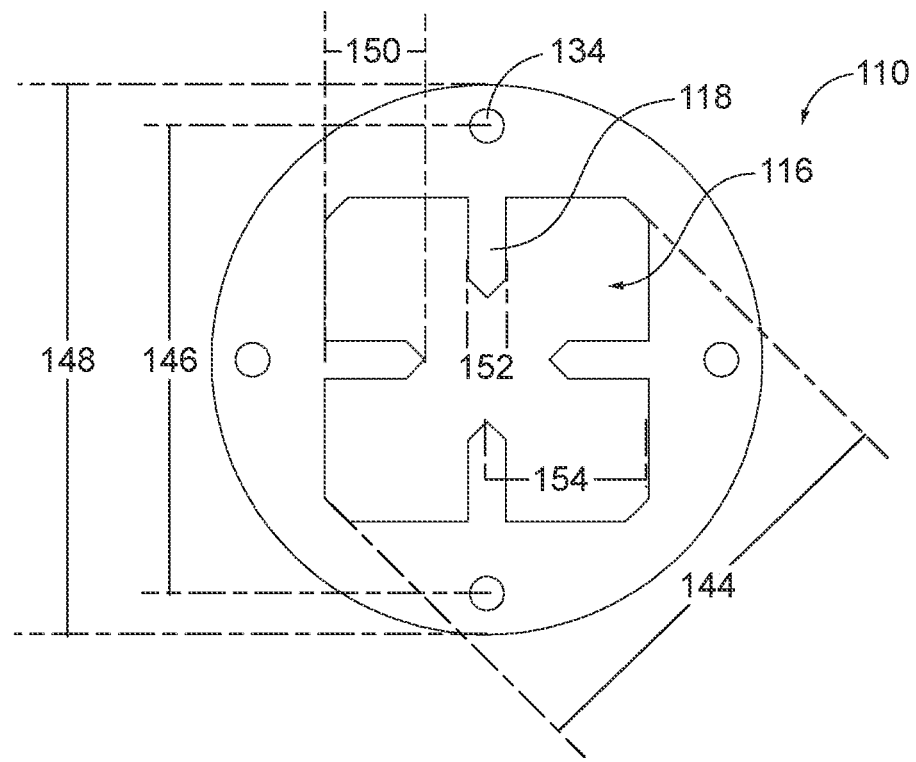
FIG. 6 is a top plan view of an exemplary cutting plate of a pod processing device.

Turning now to FIG. 6, an exemplary embodiment of a cutting plate 110 is shown. For clarity, the cutting plate 110 is shown prior to the cutting blades 118 being bent or angled upwards. In this particular embodiment, the second aperture 116 is square shaped with round corners that are disposed within a diameter 144 measured across opposing corners. In an embodiment, the diameter 144 can be around two to two and a quarter inches, and in an embodiment approximately two and one tenth inches. The second set of screw holes 134 can be arranged around the second aperture 116 such that opposing screw holes are at a distance 146 from each other. In an embodiment, the distance 146 can be around two to two and a half inches, and in an embodiment approximately two and a third inches. Further, the cutting plate 110 can have an outer diameter 148. In an embodiment, the outer diameter 148 can be around two and a half to three inches, and in an embodiment approximately two and three quarter's inches. The cutting blades 118 can have a length 150 from the perimeter of the second aperture 116 extending out to the tip of the cutting blade 118. In an embodiment, the length 150 can be around one quarter to three quarter inches, and in an embodiment approximately half an inch. The cutting blades 118 can have a width 152. In an embodiment, the width 152 can be around one tenth to three tenths of an inch, and in an embodiment approximately two tenths of an inch. The cutting blades 118 can be arranged at the center of individual sides of the perimeter of the second aperture 116 at a distance 154 from an adjacent side of the second aperture 116. In an embodiment, the distance 154 can be around three quarters to one inch, and in an embodiment approximately eight tenths of an inch.

Figure 7:
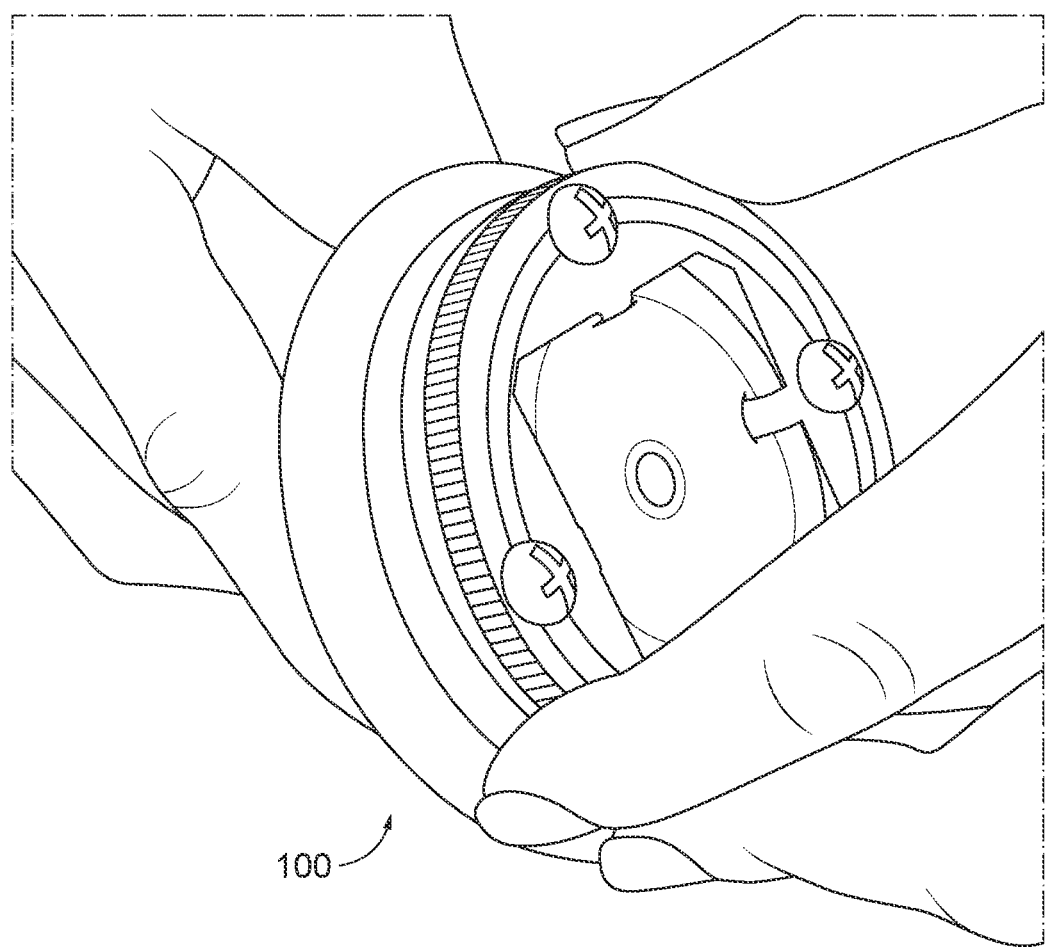
FIG. 7 is a representation of an exemplary pod processing device receiving a pod.
Figure 8:
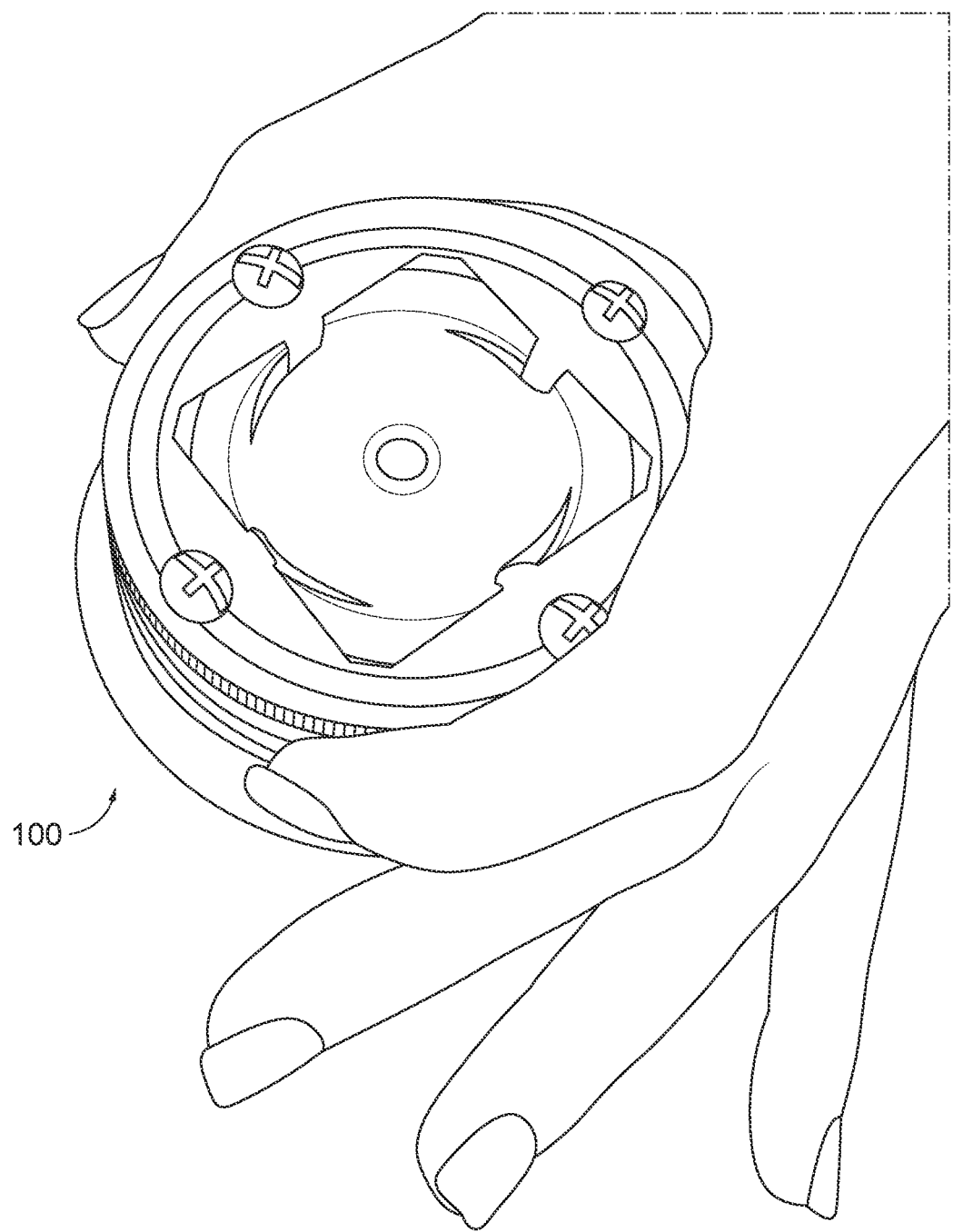
FIG. 8 is a representation of an exemplary pod processing device cutting the cover of a pod.

Turning now to FIGS. 7 and 8, the pod processing device 100 is shown being used to cut the lid from a pod. The pod processing device 100 can receive a pod within the first aperture 108 of the pod processing device 100. As the top of the pod is inserted through the first aperture 108, the lid (e.g. a foil seal) on the top of the pod is pierced with the tips of the cutting blades 118 as shown in FIG. 7. The pod can be inserted until the lid of the pod contacts the top surface 112 of the cutting plate 110 and/or a base of the cutting blades. The pod can be rotated within the pod processing device 100 such that the cutting blades 118 cut through the lid of the pod as the pod is rotated as shown in FIG. 8. Alternatively, the pod processing device 100 can be rotated around the pod such that the cutting blades 118 cut through the lid of the pod as the pod processing device 100 is rotated. Depending on the number of cutting blades 118, the pod may not require a complete rotation for the pod's lid to be fully removed. For example, in an embodiment having four cutting blades 118, a ninety degree rotation (a quarter turn) of the pod would cause the cutting blades 118 to cut a complete circle into the pod's lid and fully detach at least a section of the lid from the pod. In certain embodiments, when the lid is fully detached from the top of the pod, the cutting blades 118 can retain the lid between the cutting blades 118 as the pod is removed from the pod processing device 100 through the first aperture 108. The lid of the pod can then be removed by hand from between the cutting blades 118. The lid of the pod can then be recycled or disposed.

After the lid is removed from the pod, the contents of the pod can be emptied into a container to allow, for example, for composting or suitable recycling. The pod can be squeezed and/or agitated to facilitate removal of the contents from the pod. Further, a utensil such as a spoon, fork, knife, or stick can be used to scrape the contents out of the pod. After the contents are emptied from the pod, the remaining pod material can be further processed for recycling, or otherwise disposed.

Figure 9:
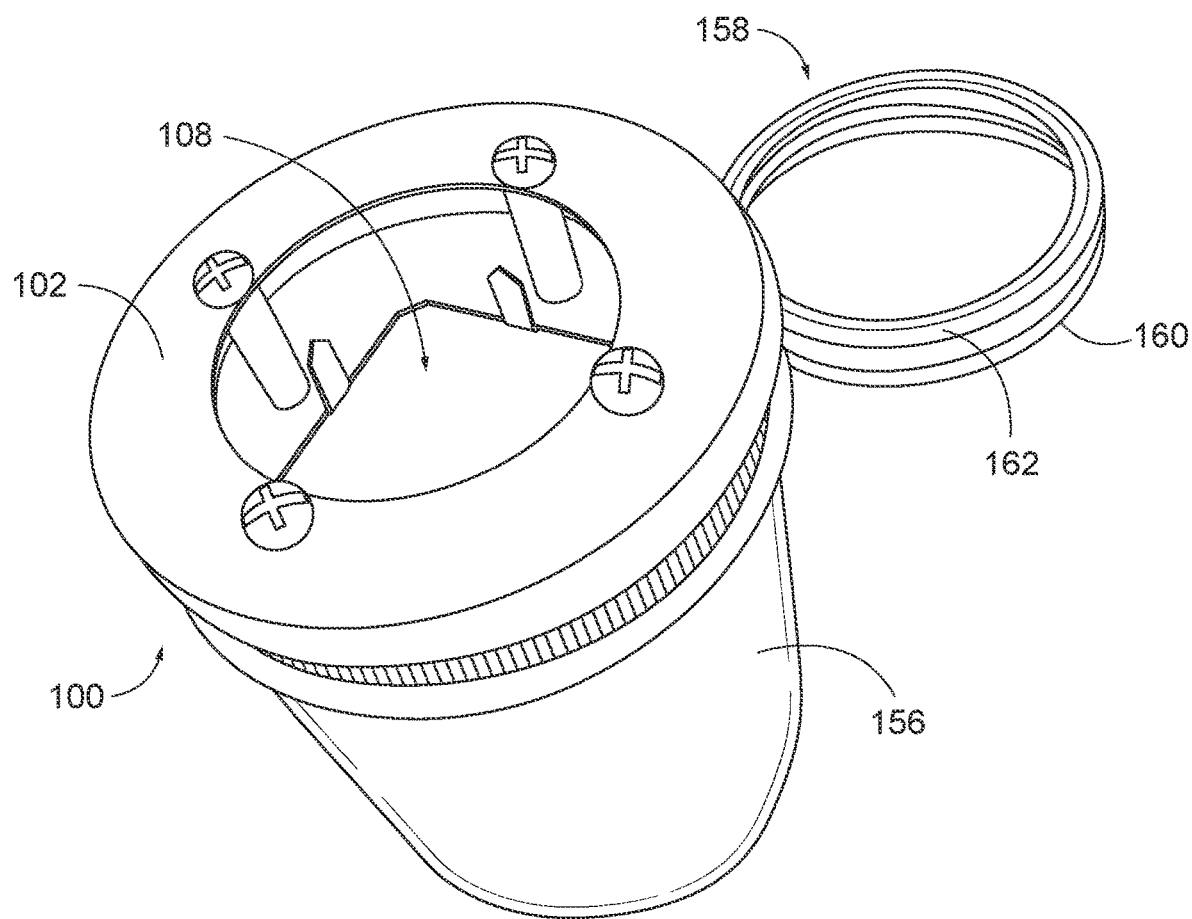
FIG. 9 is a top perspective view of an exemplary pod processing device inserted into the opening of a container.
Figure 10:
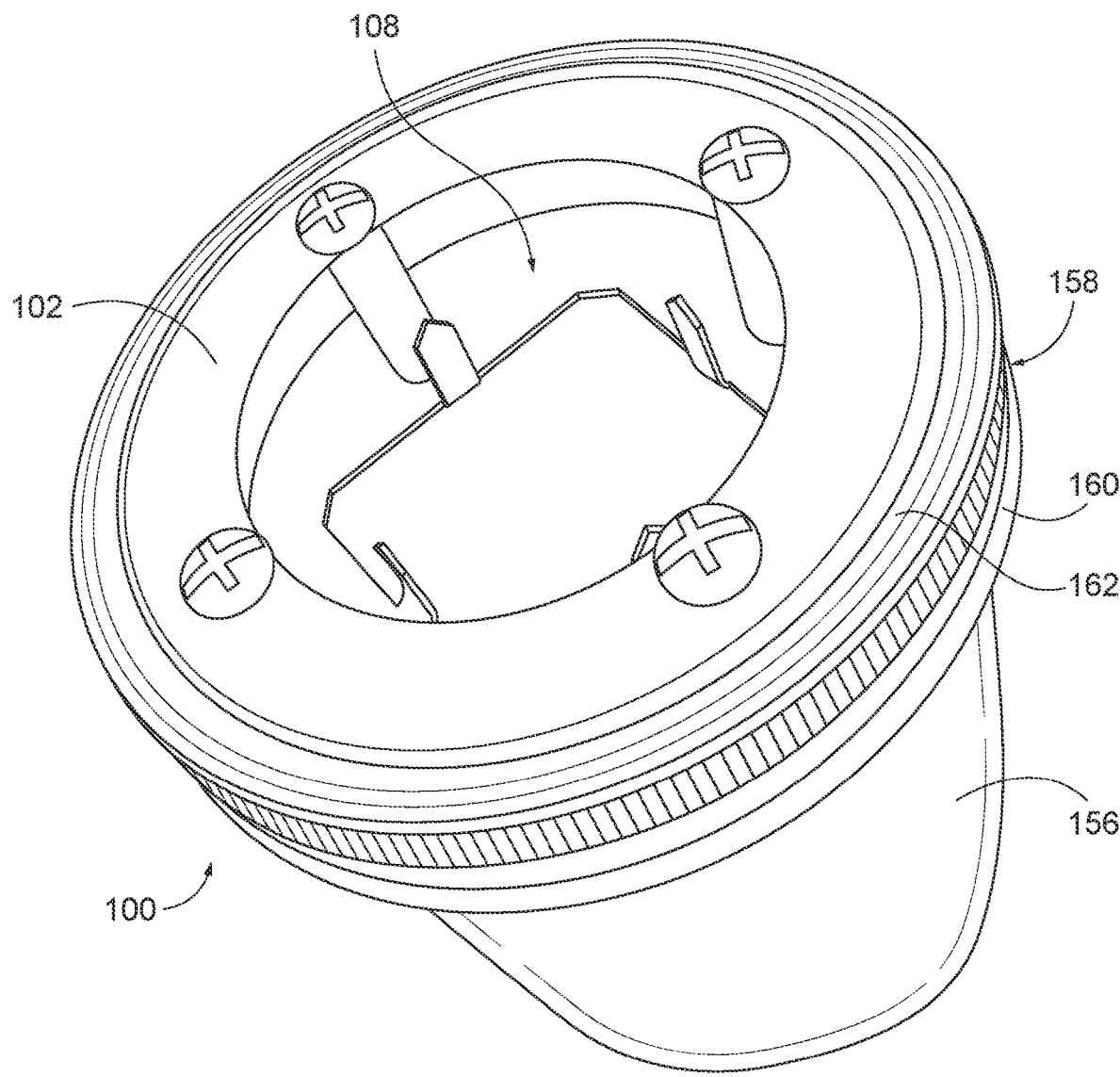
FIG. 10 is a top perspective view of an exemplary pod processing device secured within the opening of a container.

As shown in FIGS. 9 and 10, certain embodiments of the pod processing device 100 can be secured within an opening of a container 156 such as a jar, a bucket, a bag, a box, among others. In these embodiments, the pod processing device 100 can further include a securing lid 158 configured to secure the pod processing device 100 to a rim of the container 156. The securing lid 158 can include a circular sidewall 160 having a threaded interior and a lip 162 that extends inwards around a top circumference of the circular sidewall 160. The pod processing device 100 can be configured and sized to be inserted into an opening of the container 156 such that the bottom surface 114 of the cutting plate 110 faces downwards into the container 156 and the bottom side 106 of the top plate 102 rests on the rim of the container 156. As shown in FIG. 10, the securing lid 158 can be screwed onto the rim of the container 156 over the pod processing device 100 such that the lip 162 compresses the top plate 102 onto the rim of the container 156 to secure the pod processing device within the opening of the container 156. In another embodiment, the securing lid 158 can include clamps or latches that can clamp or latch the securing lid 158 onto the rim of the container 156 over the pod processing device 100. When secured in the opening of a container 156, the pod processing device 100 provides access to the interior of the container through the first aperture 108 and the second aperture 116.

Figure 11:
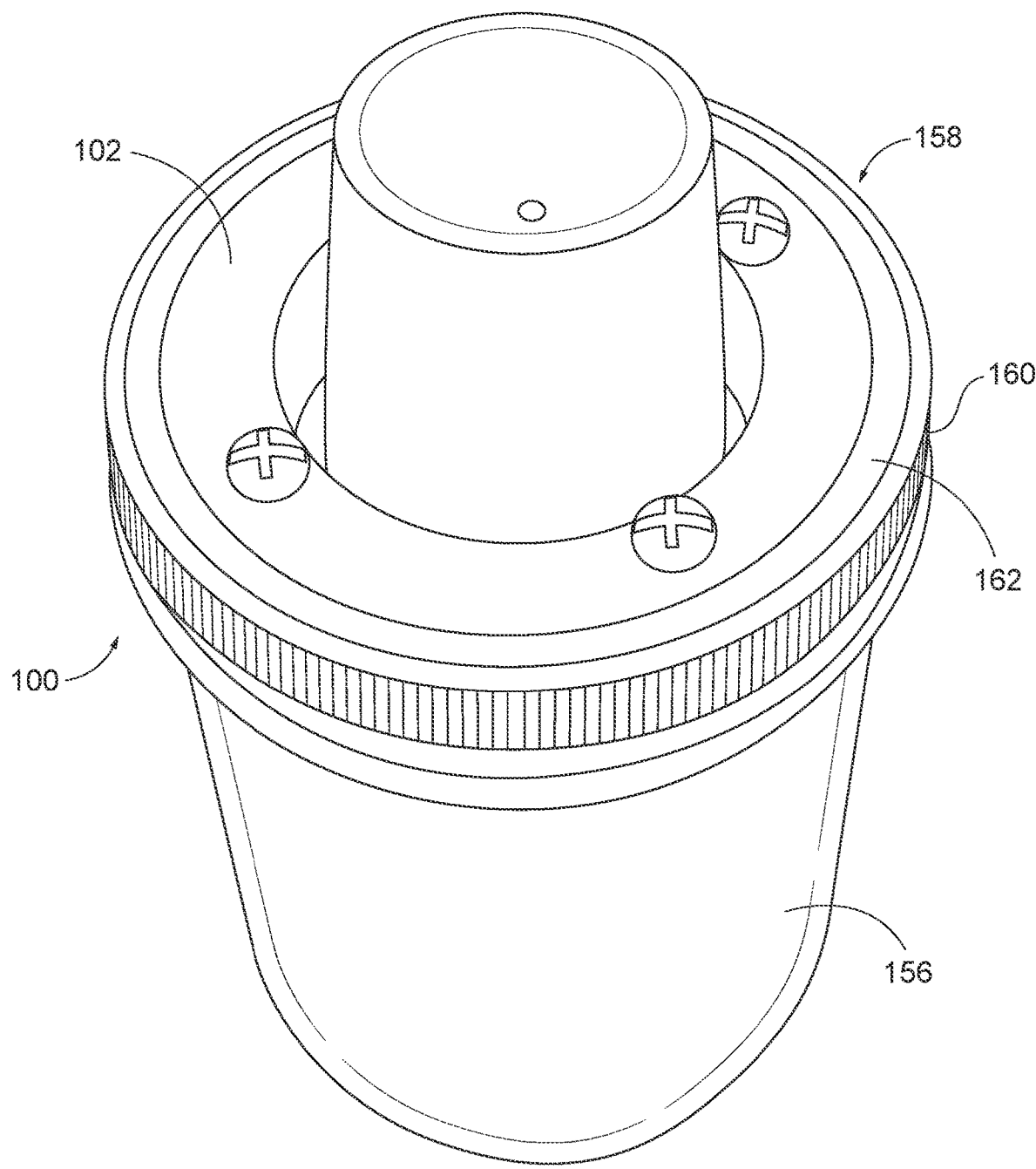
FIG. 11 is a top perspective view of an exemplary pod processing device receiving a pod.

As shown in FIG. 11, the pod processing device 100 can be used to cut and remove the lid of the pod as described above in reference to FIGS. 7 and 8. In embodiments where the pod processing device 100 is secured to the rim of a container 156, the container 156 can be used as a grip while the pod is rotated within the pod processing device 100 or the pod processing device 100 is rotated around the pod. In an embodiment, the lid can be substantially cut, but not completely cut during the process. The pod can be removed from the device and the lid removed by the user. After the lid of the pod is cut and removed, the pod can be reintroduced into the device and the contents of the pod can be emptied through the first aperture 108 and the second aperture 116, and into the interior of the container 156. The container 156 can be used to collect and store the contents of the pod so that the contents can be later composted.

In one embodiment, after the lid is cut and removed from the pod, the pod can be squeezed and/or agitated to cause the contents of the pod to fall out of the pod, through the first aperture 108, the second aperture 116, and into the container 156. In another embodiment, after the lid is cut and removed from the pod, the open top of the pod can be re-inserted into the first aperture 108 until the top of the pod contacts the top surface 112 of the cutting plate 110 so that the cutting blades 118 penetrate into the exposed contents of the pod. The pod can be rotated within the pod processing device 100 or the pod processing device 100 can be rotated around the pod such that the cutting blades 118 agitate and/or scrape the contents of the pod to cause the contents to fall out of the pod, through the second aperture 116, and into the container 156. While the pod and/or pod processing device 100 are being rotated, the pod can also be squeezed and/or agitated to further cause the contents to fall out of the pod and into the container 156. If contents still remain within the pod, a utensil such as a spoon, fork, knife, or a stick can be used to scrape the remaining contents into the container 156. After the contents are emptied from the pod, the remaining pod material can be further processed for recycling, or otherwise disposed of.

In another embodiment, after the lid is cut from the pod, the pod can be emptied into the container 156 such that the lid and the contents of the pod fall into the container 156. In this embodiment, the pod does not need to be removed from the pod processing device 100 to remove the lid from the pod prior to emptying the pod contents into the container 156.

The aforementioned systems, components, and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

The above examples are merely illustrative of several possible embodiments of various aspects of the present innovation, wherein equivalent alterations and/or modifications will occur to others skilled in the art upon reading and understanding this specification and the annexed drawings. In particular regard to the various functions performed by the above described components (assemblies, devices, and the like), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the illustrated implementations of the innovation. In addition although a particular feature of the innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovation, including the best mode, and also to enable one of ordinary skill in the art to practice the innovation, including making and using any devices or systems and performing any incorporated methods.

The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovation has been described for purposes of illustrating the best mode known to the applicant at the time and enable one of ordinary skill in the art to practice the innovation, including making and using devices or systems and performing incorporated methods. The examples are illustrative only and not meant to limit the innovation, as measured by the scope and merit of the claims. The innovation has been described with reference to preferred and alternate embodiments. It is to be understood that modifications and alterations will occur to others upon the reading and understanding of the specification. It is intended to include all such modifications and alterations insofar as they come within the scope of the appended claims or the equivalents thereof. The patentable scope of the innovation is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A pod processing device comprising:
   a first plate having a first aperture; and
   a cutting plate having a first surface and a second surface opposite the first surface, the cutting plate being attached to the first plate such that the cutting plate is spaced a distance from the first plate, wherein the cutting plate comprises:
   a second aperture having a square shape with four sides and non-orthogonal transitions at corners of the square shape; and
   a plurality of cutting blades arranged on a perimeter of the second aperture with one cutting blade of the plurality of cutting blades on each of the four sides of the second aperture, and the plurality of cutting blades extending at an angle from the first surface of the cutting plate along a portion of the distance towards the first plate.

2. The pod processing device of claim 1, wherein at least one spacer is used to space the cutting plate the distance from the first plate.

3. The pod processing device of claim 2, wherein a fastener extends through the first plate or the cutting plate and into the at least one spacer to couple the cutting plate to the first plate.

4. The pod processing device of claim 1, further comprising a ring having a rim portion and a grip portion, wherein the cutting plate is coupled to the ring such that the cutting plate contacts the rim portion.

5. The pod processing device of claim 4, wherein the ring is fastened to the cutting plate.

6. The pod processing device of claim 1, wherein the first aperture of the first plate has a circumference and the plurality of cutting blades extend towards a point within the circumference of the first aperture.

7. The pod processing device of claim 1, wherein the corners of the square shape are angled corners.

8. A pod processing device comprising:
   a first plate having a first aperture;
   a cutting plate having a first surface and a second surface opposite the first surface, the cutting plate being attached to the first plate such that the cutting plate is spaced a distance from the first plate, wherein the cutting plate comprises at least one cutting blade extending at an angle from the first surface of the cutting plate along a portion of the distance towards the first plate; and
   a securing lid comprising a circular sidewall having a threaded interior, and the securing lid comprising a lip extending inwards around a top circumference of the circular sidewall,
   wherein the pod processing device is configured to be inserted into an opening of a container with the first plate resting on a rim of the container and the second surface of the cutting plate facing downwards into the container, such that the first plate is configured to be compressed onto the rim of the container by the lip of the securing lid when the securing lid is fastened onto the rim of the container to secure the pod processing device within the opening of the container.

9. A pod processing device comprising:
   a first plate having a first aperture and a first set of holes arranged around the first aperture;
   a cutting plate having a second aperture, a plurality of cutting blades arranged on a perimeter of the second aperture, and a second set of holes arranged around the perimeter of the second aperture;
   a plurality of spacers, each of the plurality of spacers are axially aligned with a respective one of the holes from the first set of holes on the first plate and a respective one of the holes from the second set of holes on the cutting plate;
   a first set of fasteners, wherein each of the first set of fasteners is inserted through a corresponding hole from the first set of holes such that the first set of fasteners fasten the first plate to a first end of each of the plurality of spacers;
   a second set of fasteners, wherein each of the second set of fasteners is inserted through a corresponding hole from the second set of holes such that the second set of fasteners fasten the cutting plate to a second end of each of the plurality of spacers; and
   a ring having a rim surface and a grip portion, wherein the cutting plate is coupled to the ring such that the cutting plate contacts the rim surface.

10. The pod processing device of claim 9, wherein the plurality of spacers create a distance between the first plate and the cutting plate, and the plurality of cutting blades extend at an angle from a first surface of the cutting plate along a portion of the distance towards the first aperture.

11. The pod processing device of claim 9, wherein the ring is fastened to the cutting plate and the second end of each of the plurality of spacers by the second set of fasteners.

12. The pod processing device of claim 9, wherein the pod processing device is configured to be secured within an opening of a container by a securing lid that compresses the first plate onto a rim of the container.

* * * * *